Patented Jan. 23, 1951

2,538,779

UNITED STATES PATENT OFFICE 2,538,779

MIXTURE OF ACRYLONITRILE POLYMER AND BUTADIENE COPOLYMER

Stuart A. Harrison, Stow, Ohio, and Walter E. Brown, Cambridge, Mass., assignors to The B. F. Goodrich Company, New York, N. Y., a corporation of New York No Drawing. Application May 23, 1946, Serial No. 671,898

6 Claims. (Cl. 260—29.7)

This invention relates to synthetic polymeric materials, particularly synthetic polymeric materials closely resembling natural rubber in the raw uncompounded condition in strength and elasticity, and to methods of preparing the same, and it is especially concerned with the preparation of polymeric materials in which a major proportion of a rubbery copolymer of a butadiene-1,3 hydrocarbon and another polymerizable compound is uniformly and intimately combined with a minor proportion of a hard solid resinous polymer such as polyacrylonitrile.

It is well known that synthetic rubbers which are prepared predominantly from a butadiene-1,3 hydrocarbon (often called butadiene synthetic rubbers) such as the rubbery copolymers of butadiene-1,3 and styrene and the rubbery copolymers of butadiene-1,3 and acrylonitrile are generally much weaker and less elastic when vulcanized in a "pure gum" recipe (that is, a recipe which includes the rubbery material and vulcanizing ingredients and is free from significant amounts of other compounding ingredients such as pigments, fillers, softeners, etc.) than is natural rubber. For example, "pure gum" vulcanizates of natural rubber possess a tensile strength varying from 2,000 to 3,000 lbs./sq. in. or more and are highly elastic, whereas "pure gum" vulcanizates of such synthetic rubbers possess tensile strengths generally less than 1,000 lbs./sq. in., and often as low as 200 to 500 lbs./sq. in., and are not nearly so elastic.

It is known that the compounding of such synthetic rubbers with carbon black prior to vulcanization, however, remarkably improves their tensile strength, to an extent even greater than it does with natural rubber, and consequently it has been possible, by using large amounts of carbon black, to manufacture articles from these synthetic rubbers of the required high tensile strength. But the use of carbon black also produces other effects, some of which are quite undesirable in many applications. Besides producing a black coloration, which is undesirable for many purposes, the presence of carbon black increases the stiffness of these synthetic rubbers and in many instances it increases the hysteresis loss, decreases the resistance to flex-cracking and lowers the electrical resistivity of the synthetic rubber. As a result the compounder of such synthetic rubbers must either use sufficient carbon black to attain the desired strength, even though the other properties produced may not be entirely advantageous, or else not use sufficient carbon black and produce a weaker compound than would be desirable.

It is, therefore, an object of this invention to modify raw synthetic rubber of the butadiene-1,3 copolymer variety to render it stronger and more elastic when vulcanized without the addition of carbon black. Further related objects are to permit the obtainment of light and brightly colored compositions of high strength and elasticity free from carbon black from such synthetic rubbers, and to improve the properties of such synthetic rubbers even when compounded with carbon black. Other objects will be apparent hereinafter.

Numerous attempts have already been made to attain these objectives but heretofore no butadiene-1,3 copolymer synthetic rubber which is vulcanizable with sulfur to a tensile strength above about 1,000 lbs./sq. in. without the addition of carbon black or inorganic reinforcing pigments (which are much less effective than carbon black in producing high strength yet generally possess all the disadvantages of carbon black except the black coloration) has been developed.

We have now discovered, however, that these and other objects are attained and that rubbery synthetic polymeric materials closely resembling natural rubber in that they may be vulcanized to produce strong snappy vulcanizates without the addition of carbon black or inorganic reinforcing pigments, and far superior to natural rubber in resistance to oxidation, to oils and greases, and to other deteriorating influences, may be obtained by first preparing an aqueous dispersion in which the dispersed phase comprises a major proportion of a rubbery copolymer of a butadiene-1,3 hydrocarbon and a copolymerizable monoolefinic compound and a minor proportion of a hard resinous polymer of a nitrile of an alpha-methylene aliphatic monocarboxylic acid, and then coagulating the dispersion. In this manner the rubbery copolymer and the hard resinous nitrile polymer, although insoluble in and incompatible with each other, become intimately bound together, with the result that the final polymeric material differs widely from either of the constituents, and also from the product secured when it is attempted to admix the constituents on a mixing mill or in an internal mixer.

Accordingly, this invention comprises the above-stated process for preparing combined polymeric materials and the novel materials obtained thereby. In practicing the process various procedures for preparing the aqueous dispersion which is coagulated to yield the polymeric materials may be employed, but best results are secured when using one of two alternative procedures.

The first of these procedures consists in polymerizing a monomeric mixture capable of producing a rubbery copolymer and comprising a butadiene-1,3 hydrocarbon and a copolymerizable compound containing a single olefinic double bond, in an aqueous emulsion in the presence of a previously prepared aqueous dispersion of hard resinous nitrile polymer, the amount of nitrile polymer present being less than that of the rubbery copolymer obtained by the polymerization. When this procedure, sometimes referred to hereinafter as "seeding" with nitrile polymer, is employed it has been found that formation of rubbery copolymer occurs on the nitrile polymer particles to produce an aqueous dispersion in which there is present dispersed solid particles containing a core of resinous nitrile polymer surrounded by a coating of rubbery copolymer.

The second procedure consists in intimately admixing an aqueous dispersion containing small particles of rubbery butadiene-1,3 hydrocarbon copolymer, preferably prepared by polymerization in aqueous emulsion, with a separately prepared aqueous dispersion containing small particles of hard resinous nitrile polymer, also preferably prepared by polymerization in aqueous emulsion, in such proportion that the weight of the rubbery copolymer is greater than that of the resinous nitrile polymer. This procedure, like the first, yields an aqueous dispersion in which the dispersed phase comprises a major proportion of rubbery copolymer and a minor proportion of hard resinous nitrile polymer, but with this procedure small particles of each of the two materials, rather than particles containing both, are present in the dispersion.

Upon coagulation of the dispersion obtained by either of the two procedures, a polymeric material containing small discrete particles of the hard resinous nitrile polymer intimately and uniformly dispersed or embedded in a continuous phase of the rubbery butadiene-1,3 hydrocarbon copolymer is secured. Since the nitrile polymer is present in the same particles as the rubbery copolymer even before coagulation occurs when the first procedure is utilized, a somewhat more uniform dispersion of nitrile polymer in the final polymeric material is obtained in this instance, and this greater uniformity is reflected in a higher tensile strength of polymeric material produced in this way. Both methods of procedure, however, yield rubbery polymeric materials of a much higher tensile strength than is obtainable without using nitrile polymer, the nitrile polymer greatly reinforcing the rubbery copolymer in each instance.

The practice of the invention utilizing each of the two preferred procedures, and the nature and properties of the polymeric materials thereby obtained, are further illustrated in the following specific examples in which all parts, unless otherwise indicated, are by weight.

*Example I*

A stable aqueous dispersion or latex of polyacrylonitrile containing about 12.5% by weight of polyacrylonitrile in the form of small particles, is prepared utilizing the method disclosed in the copending application of Stuart A. Harrison, Serial No. 683,423, filed July 13, 1946, now Patent No. 2,471,742, May 31, 1949, by emulsifying 90 parts of monomeric acrylonitrile and 45 parts of ethylene dichloride in an aqueous solution containing 522 parts of water, 54 parts of fatty acid soap and 0.54 part of potassium persulfate and then substantially completely polymerizing the acrylonitrile so emulsified at a temperature of 50° C. for about 44 hours. 240 parts of this latex is then mixed with 330 parts of water, 0.36 part of potassium persulfate as a polymerization initiator, 0.45 part of n-dodecyl mercaptan as a polymerization modifier, and a mixture of 30 parts of styrene and 90 parts of butadiene-1,3 as the monomeric polymerizable materials, the monomeric mixture being emulsified in the aqueous medium by means of the soap present in the polyacrylonitrile latex. Polymerization of the emulsified monomers is then effected at 50° C. for about 5 hours during which time about 83% of the monomers are converted into rubbery butadiene-1,3 styrene copolymer. The product of the polymerization consists of a latex-like aqueous dispersion which is then stabilized against deterioration by the addition of two parts of phenyl beta naphthylamine in the form of an aqueous dispersion, and completely coagulated by the addition of dilute sulfuric acid. The coagulum obtained is a rubbery polymeric material containing about 100 parts of butadiene-1,3 styrene copolymer in which is dispersed about 30 parts of polyacrylonitrile.

This polymeric material, after washing and drying, is compounded in the following "pure gum" recipe:

| | Parts |
|---|---|
| Polymeric material | 120 |
| Zinc oxide | 5.0 |
| Stearic acid | 1.5 |
| Benzothiazyl - 2 - monocyclohexyl sulfenamide | 1.2 |
| Sulfur | 2.0 |

It is then vulcanized for 30 minutes at 280° F. to produce a soft snappy vulcanizate resembling "pure gum" natural rubber vulcanizates and possessing a tensile strength of 3000 lbs./sq. in., an ultimate elongation of 700% and a modulus of elasticity at 300% elongation of 550 lbs./sq. in. The tensile strength of a similar "pure gum" vulcanizate of a butadiene-1,3 styrene copolymer prepared in the same way except for the presence of the polyacrylonitrile latex is only about 300 lbs./sq. in.; its elongation is less than 400% and its 300% modulus is about 225 lbs./sq. in. It is thus apparent that the presence of polyacrylonitrile greatly improves the strength and elasticity of the synthetic rubber, thereby rendering it more like natural rubber. The resistance to tearing and to abrasion of the vulcanizate containing polyacrylonitrile are also improved by the presence of the polyacrylonitrile. These improvements, however, cannot be secured when it is attempted to mill polyacrylonitrile into the synthetic rubber during compounding since the hard insoluble polyacrylonitrile does not add to the synthetic rubber and is incapable of being dispersed therein.

The above Example I illustrates the practice of the invention when "seeding" the emulsion copolymerization of a butadiene-1,3 hydrocarbon and a copolymerizable compound, with a dispersion of a nitrile polymer. The practice of the invention by mixing dispersions of a rubbery butadiene-1,3 copolymer and of a nitrile polymer, and then coagulating (or co-coagulating) the mixed dispersions is illustrated in the following Example II.

*Example II*

A polyacrylonitrile latex containing 13.7% by weight of dispersed polyacrylonitrile particles of an average diameter below 0.1 micron is prepared in a manner similar to that described in Example I by emulsifying 100 parts of acrylonitrile and 50 parts of ethylene dichloride in an aqueous medium containing 490 parts of water, 30 parts of fatty acid soap and 0.6 part of potassium persulfate, and polymerizing the emulsified acrylonitrile at a temperature of 50° C. for about 48 hours, during which time about 92% of the monomer is polymerized to a hard resinous polymer. 219 parts of this latex are then intimately admixed with stirring with 384 parts of a latex of a rubbery copolymer of butadiene-1,3 and styrene containing 26% by weight of small particles about 0.08 micron in average diameter of the rubbery copolymer, and prepared by polymerizing at 50° C. a mixture of 75 parts of butadiene-1,3 and 25 parts of styrene in an aqueous emulsion containing 180 parts of water, 5 parts of fatty acid soap, 0.3 part of potassium persulfate and 0.5 part of n-dodecyl mercaptan, and then adding 2 parts of phenyl beta-naphthylamine. The mixed latex is co-coagulated by adding it to 75 parts of a 25% sodium chloride solution and then adding alcohol until coagulation is complete. The polymeric material obtained after washing and drying the coagulum comprises 100 parts of butadiene-1,3 styrene copolymer and 30 parts of dispersed polyacrylonitrile. It is compounded in the "pure gum" recipe set forth in Example I using the same proportions of ingredients based on the rubbery copolymer content of the polymeric material, and is vulcanized for 45 minutes at 280° F. A soft snappy vulcanizate resembling natural rubber "pure gum" vulcanizates is again obtained, the vulcanizate possessing a tensile strength of 2400 lbs./sq. in., an ultimate elongation of 710% and a 300% modulus of 325 lbs./sq. in.

Numerous modifications and variations in the materials used in the above examples, in the proportions of materials and in the manipulative procedures may be effected while still obtaining polymeric materials which are vulcanizable with sulfur to a tensile strength above about 1,000 lbs./sq. in. in a "pure gum" recipe. The most important of these will be discussed hereinbelow. Others will be apparent without discussion to those skilled in the art.

Any rubbery vulcanizable copolymer of a butadiene-1,3 hydrocarbon and a copolymerizable compound containing a single olefinic double bond may constitute the continuous phase of the polymeric materials of this invention. Such copolymers are well known as a class, and include copolymers prepared by the polymerization of monomer mixtures containing a predominant amount of any butadiene-1,3 hydrocarbon such as butadiene-1,3, isoprene, 2,3-dimethyl-butadiene-1,3 or piperylene or a combination of two or more of these, and also containing one or more copolymerizable compounds containing a single olefinic double bond. Such compounds include, for examples, styrene, alpha-methylstyrene, p-methylstyrene, p-methoxystyrene, p-chlorostyrene, dichlorostyrenes, m-bromostyrene, vinyl naphthalene and other alkenyl substituted aromatic compounds of the formula

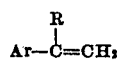

wherein Ar is an aromatic radical having its connecting valence on a ring carbon atom and R is hydrogen or alkyl; acrylonitrile, methacrylonitrile, ethacrylonitrile, alpha-chloroacrylonitrile, methyl methacrylate, ethyl methacrylate, isobutyl methacrylate, methyl acrylate, propyl acrylate, butyl acrylate, octyl acrylate, methyl alpha-chloro acrylate, methacrylamide, acrylamide, N,N-diethyl acrylamide and other nitriles, amides and alkyl esters of alpha-methylene aliphatic monocarboxylic acids; diethyl fumarate, diethylchloromaleate, vinylidene chloride, methyl vinyl ketone, methyl isopropenyl ketone, vinyl pyridines, vinyl furan, vinyl carbazole, isobutylene, ethylene and the like. Rubbery vulcanizable copolymers are also obtained in many instances from monomer mixtures containing a lesser amount of the butadiene-1,3 hydrocarbon than of the copolymerizable monoolefinic compound, and such copolymers may also constitute the continuous phase of the polymeric materials herein described. It is generally desirable, however, that the copolymer be prepared from a monomer mixture containing at least about 30% and preferably from 50 to 90% by weight of butadiene-1,3 hydrocarbon, preferably butadiene-1,3, and the remainder of copolymerizable monomeric material containing a single olefinic double bond, preferably styrene or acrylonitrile.

Many variations in the method of preparation of such rubbery copolymers may also be employed. Thus, when the polymeric materials of this invention are obtained by polymerization of the monomer mixtures described, in aqueous emulsion in the presence of a "seed" dispersion of a hard resinous nitrile polymer, as is illustrated in Example I, such polymerization may involve the use of any of the various emulsifying agents, polymerization initiators, catalysts, modifiers, etc., customarily employed in the aqueous emulsion polymerization of such monomer mixtures provided, of course, that they do not coagulate the "seed" dispersion. Similarly, when the polymeric materials of this invention are obtained by admixing and co-coagulating separately prepared aqueous dispersions of the rubbery copolymer and of the resinous nitrile polymer, the dispersion of rubbery copolymer may be one prepared by polymerization in aqueous emulsion utilizing any of the various emulsifying agents, initiators, catalysts, modifiers, etc., or it may even be one prepared by dispersing in an aqueous medium a rubbery copolymer originally obtained by polymerization by heat or in any other manner; but it is preferable that such dispersion contain small particles, no larger than about 0.4 micron and preferably less than 0.1 micron in average diameter, of the rubbery copolymer.

The aqueous dispersion of hard resinous nitrile polymer utilized in this invention may also be modified considerably. In general, any aqueous dispersion of a hard, resinous, saturated polymer of a monomeric material composed predominantly of one or more nitriles of an alpha-methylene aliphatic monocarboxylic acid, such as acrylonitrile, methacrylonitrile, ethacrylonitrile, alpha-chloro acrylonitrile or the like, is suitable. Although dispersions of polymers of monomeric material composed exclusively of such nitriles are sometimes preferred, minor proportions of other compounds copolymerizable with the nitrile to form hard resinous saturated copolymers, such as styrene, vinyl chloride, vinylidene chloride, methyl methacrylate and other monomers containing a single olefinic double bond may also be present in the monomeric material from which the resinous polymer is formed. It is also preferred that the dispersion be prepared by polymerization of the monomeric material in aqueous emulsion in the presence of a non-polymerizable chlorinated aliphatic compound or a non-polymerizable aromatic hydrocarbon in the manner disclosed in the copending applications of Stuart A. Harrison, Serial Nos.

683,423, and 683,424, filed July 13, 1946, and July 13, 1946, respectively, now Patents 2,471,742 and 2,471,743, respectively, issued May 31, 1949, but any other aqueous dispersion of such a nitrile polymer may also be employed, it being desirable that the size of the nitrile polymer particles in the dispersion be no greater than about 0.4 micron and preferably below 0.1 micron in average diameter.

As mentioned hereinabove, the aqueous dispersion which is prepared in the method of this invention (either by the polymerization of a monomer mixture polymerizable to form a rubbery copolymer and containing a butadiene-1,3 hydrocarbon and a copolymerizable compound containing a single olefinic double bond in the presence of a dispersion of a hard resinous nitrile polymer; or by the admixing of aqueous dispersions of the rubbery copolymer and of the resinous nitrile polymer) comprises a major proportion of the rubbery copolymer and a minor proportion of the resinous nitrile polymer. The precise proportions may be varied throughout the range of 1 to 100 parts of resinous nitrile polymer for each 100 parts of rubbery copolymer; and in each instance a rubbery vulcanizable polymeric material of higher tensile strength than the rubbery copolymer alone, is obtained on coagulation of the dispersion. However, polymeric materials most useful for most purposes are secured when the proportion of nitrile polymer is from 5 to 80 parts, more preferably from 15 to 60 parts, to each 100 parts of rubbery copolymer, since such polymeric materials when vulcanized give strong snappy vulcanizates resembling those obtainable from natural rubber. When the proportion of nitrile polymer is increased to 80 to 100 parts for each 100 parts of rubbery copolymer, the polymeric materials are still rubbery and capable of vulcanization but are somewhat stiffer and more like leather when vulcanized.

Coagulation of the aqueous dispersion comprising the rubbery copolymer and the hard resinous nitrile polymer to yield the polymeric materials of this invention, may be effected by any of the various well-known procedures for coagulating dispersions. The precise procedure most suitable in any given instance will depend, of course, upon the nature of the dispersion, particularly the emulsifying or dispersing agents present therein, and upon the use to be made of the final polymeric material. When the invention is carried out by mixing aqueous dispersions of the rubbery copolymer and of the resinous nitrile polymer, and the particles in the two dispersions have opposite electrical charges, co-coagulation of the dispersions occurs by reason of the different charges and no coagulating agent is required. Drying of a layer of the dispersion to form a film or sheet of polymeric material is another method of coagulation which requires no chemical coagulating agent. In most instances, however, the dispersion is coagulated by bringing it into contact with one or more chemical coagulating agents such as an acid, base or salt or other electrolyte, or an alcohol or the like, as by adding it to a solution of the coagulant in liquid form, adding coagulating agents to the dispersion, by dipping a form coated with coagulant in the dispersion, by bringing together flowing liquid streams of a liquid coagulant and of the dispersion, or in any other desired manner.

Compounding ingredients such as softeners, plasticizers, pigments, fillers, colors, stabilizing agents, antioxidants, vulcanizing ingredients, etc. may be added to the dispersion before coagulation or to the polymeric materials obtained after coagulation in the manner well-known to the art, if desired, it being understood that the presence or absence of such materials will depend primarily upon the use to be made of the finished product and is in no way critical in this invention.

The above-discussed modifications and variations in the practice of the invention are specifically illustrated in the following examples, in which procedures similar to those of Examples I and II are utilized.

*Examples III to VIII*

In these examples, rubbery polymeric materials are prepared by the polymerization at 50° C. of a monomer mixture of butadiene-1,3 and acrylonitrile containing 55% by weight of butadiene-1,3 in an aqueous emulsion containing for each 100 parts of monomers, about 2.5 parts of a polyalkylarylsulfonate known as "Daxad 11" as emulsifying agent, about 0.3 part of hydrogen peroxide as polymerization initiator, about 0.6 part of diisopropyl dixanthogen as polymerization modifier, and about 0.2 part of a polymerization catalyst comprising complex pyrophosphates of iron and cobalt, in the presence of various previously prepared aqueous dispersions of nitrile polymers in varying proportions. The aqueous dispersions of nitrile polymers utilized are as follows:

A. A polyacrylonitrile latex identical with that disclosed in Example II hereinabove.

B. A latex containing 12.7% by weight of extremely small particles (below about 0.1 micron in average diameter) of a hard resinous copolymer of acrylonitrile and styrene, the latex being prepared by emulsifying 50 parts of acrylonitrile, 5 parts of styrene, 40 parts of ethylene dichloride, 0.35 part of tri-isobutyl mercaptan, and 0.2 part of p-methoxyphenyl - diazo - thiobeta - naphthyl ether in 300 parts of water containing 10 parts of fatty acid soap and 0.3 part of potassium ferricyanide and then polymerizing the emulsified acrylonitrile and styrene at 30° C. for 16 hours whereupon 94% of the monomers are converted into hard resinous copolymer.

C. A latex containing about 13% by weight of small particles (below about 0.4 micron in average diameter) of a hard resinous copolymer of acrylonitrile and methacrylonitrile, the latex being prepared by emulsifying 50 parts of acrylonitrile, 50 parts of methacrylonitrile and 50 parts of ethylene dichloride in 500 parts of an aqueous solution containing 30 parts of fatty acid soap and 0.6 part of potassium persulfate, and then polymerizing the emulsified nitriles at 50° C. for about 44 hours.

D. A latex containing about 13% by weight of polymethacrylonitrile prepared as in C above except that 100 parts of methacrylonitrile are employed in place of the mixed nitriles.

In each instance an aqueous dispersion is obtained by the polymerization, which is then coagulated by the addition of dilute sulfuric acid to yield a polymeric material comprising a continuous phase of a rubbery butadiene-1,3 acrylonitrile copolymer in which discrete particles of resinous polymer below 0.4 micron in average diameter are uniformly dispersed. The polymeric materials are then compounded in a "pure gum" recipe as in Examples I and II, and vulcanized at 280° F. The particular resinous nitrile dispersion used, its proportion to that of rubbery copolymer, and the tensile strength, elongation and 300% modulus of the vulcanizates, for each of the examples, together with that of a control containing no nitrile polymer are shown in the following tabulation:

| Example No. | Nitrile Polymer Dispersion Utilized | Parts Nitrile Polymer to 100 Parts of Rubbery Copolymer | Vulcanizate | | |
|---|---|---|---|---|---|
| | | | Tensile Strength lbs./sq. in. | Elongation Per Cent | 300% Modulus lbs./sq. in. |
| 3 | A | 10.4 | 2,400 | 700 | 275 |
| 4 | A | 30.6 | 3,500 | 670 | 500 |
| 5 | A | 50.0 | 3,355 | 640 | 750 |
| 6 | B | 30.9 | 4,200 | 680 | 825 |
| 7 | C | 30.4 | 3,175 | 630 | 800 |
| 8 | D | 30.2 | 3,200 | 540 | 1,500 |
| Control | None | | 625 | 530 | 200 |

It is apparent that the presence of the nitrile polymer greatly reinforces the rubbery butadiene-1,3 acrylonitrile copolymer in each instance. In fact, the tensile strengths and elongations of the vulcanizates are substantially as high as is obtained when the rubbery copolymer is compounded with an amount of carbon black equal in volume to that of the nitrile polymer; yet the vulcanizates are light colored rather than black, are generally not so stiff as the carbon black vulcanizates and retain their softness and flexibility at lower temperatures.

*Examples IX to XVIII*

In these examples a polyacrylonitrile latex containing about 10.5% by weight of dispersed solid polyacrylonitrile particles below about 0.4 micron in average diameter, prepared by the polymerization of 100 parts acrylonitrile in an aqueous emulsion containing 45 parts of ethylene dichloride, 548 parts of water, 45 parts of fatty acid soap and 0.54 part of potassium persulfate, is mixed with various proportions of the rubbery butadiene-1,3 styrene copolymer latex used in Example II. The mixed latices are then co-coagulated by spreading on a glass surface and drying to form clear films of polymeric material. The polymeric materials are then compounded in a "pure gum" recipe, and vulcanized in the manner of the preceding examples. The proportion of polyacrylonitrile to rubbery butadiene-1,3 styrene copolymer, and the properties of the vulcanizates are shown in the following table:

| Example No. | Parts Polyacrylonitrile to 100 Parts butadiene-1,3 Styrene Copolymer | Vulcanizate | | |
|---|---|---|---|---|
| | | Tensile Strength, lbs./sq. in. | Ultimate Elongation, Per cent | 300% Modulus, lbs./sq. in. |
| Control | 0 | 175 | 520 | 175 |
| 9 | 10 | 800 | 600 | 175 |
| 10 | 20 | 1,800 | 600 | 175 |
| 11 | 30 | 2,300 | 1,020 | 200 |
| 12 | 40 | 2,275 | 900 | 300 |
| 13 | 50 | 2,100 | 780 | 300 |
| 14 | 60 | 2,650 | 840 | 450 |
| 15 | 70 | 2,750 | 860 | 500 |
| 16 | 80 | 1,900 | 760 | 550 |
| 17 | 90 | 1,925 | 810 | 600 |
| 18 | 100 | 1,475 | 580 | 725 |

Again it is apparent that the dispersed polyacrylonitrile greatly reinforces the rubbery copolymer. It should be noted, however, that the tensile strength of the polymeric material does not increase with the proportion of acrylonitrile after a maximum is reached, thus indicating that the increased tensile strength is not due merely to an additive effect of the harder and stronger nitrile polymer.

In the specific examples set forth hereinabove the dispersions comprising in the dispersed phase a major proportion of rubbery copolymer and a minor proportion of hard resinous nitrile polymer, which are coagulated to yield the polymeric materials described, have been prepared either by polymerization to form the rubbery copolymer in the presence of a dispersion of the nitrile polymer only or by mixing separately prepared dispersions in which the two materials are the only polymeric materials present. Although these procedures are preferred other procedures are also operative to produce the results described. For example, an aqueous dispersion of polymeric material prepared by emulsion polymerizing styrene (or some other monoolefinic monomer polymerizable to a saturated polymer) and then polymerizing a nitrile on the particles of the saturated polystyrene polymer, possesses many of the characteristics of a dispersion in which the only polymeric material present is the nitrile polymer, and may be used therefor. Moreover, it is also possible to prepare a dispersion containing rubbery copolymer on the surfaces of particles of nitrile polymer, as by the "seeding" procedure, and then to mix this dispersion with a dispersion of rubbery copolymer. Still other methods of forming an aqueous dispersion in which the dispersed phase comprises molecules of nitrile polymer and separate molecules of rubbery butadiene-1,3 hydrocarbon copolymer may also be utilized. It should be mentioned, however, that the desired result is not secured unless the nitrile is polymerized before brought into contact with the rubbery copolymer or the monomers capable of forming the rubbery copolymer, since monomeric nitrile copolymerizes or chemically combines with such materials during its polymerization and hence the physical structure (consisting of a continuous phase of molecules of rubbery copolymer and a dispersed phase of separate molecules of nitrile polymer) characteristic of the polymeric materials of this invention, is not produced.

The polymeric materials of this invention may be utilized for many widely different purposes as will be apparent to those skilled in the art. In general they are useful for the same purposes as natural rubber and synthetic rubbers, but are superior in many respects thereto. The specific examples illustrate their properties only when compounded and vulcanized in a "pure gum" test recipe, but it will be understood that they may be compounded and vulcanized in a manner similar to natural rubber and butadiene synthetic rubbers, bearing in mind that they already contain dispersed particles and hence may be said to be compounded to that extent, and that their properties may be varied thereby. The addition of carbon black, for example, increases their tensile strength even further, compounds of great strength thereby being obtained. The polymeric materials of this invention possess considerable resistance to oils and solvents and greatly excel natural rubber in these respects, yet they, unlike butadiene synthetic rubbers, may be vulcanized to strong snappy vulcanizates without the addition of carbon black. Numerous specific applications for a material of these properties will be obvious to those skilled in the art.

It will be apparent from the above description that the invention is not limited to the specific examples given, but only as required by the spirit and scope of the appended claims.

We claim:

1. The method of producing rubbery vulcanizable polymeric materials which comprises admixing an aqueous dispersion of particles less than .4 micron in diameter of a major proportion of a rubbery copolymer derived from a monomeric mixture containing 50 to 90% by weight of butadiene-1,3 and the remainder of copolymerizable monomeric material containing a single olefinic double bond selected from the class consisting of styrene and acrylonitrile with an aqueous dispersion of particles less than .4 micron in diameter of a minor proportion of a hard resinous saturated polymer of a monomeric material composed predominantly of a nitrile of an alpha-methylene aliphatic monocarboxylic acid, and then co-coagulating the mixed dispersions.

2. The method of producing rubbery vulcanizable polymeric materials which comprises admixing an aqueous dispersion comprising particles less than .4 micron in diameter of a major proportion of a rubbery copolymer prepared by the polymerization in aqueous emulsion of a monomeric mixture containing 50 to 90% by weight of butadiene-1,3 and the remainder of acrylonitrile, with an aqueous dispersion comprising particles less than .4 micron in diameter of a minor proportion of a hard resinous saturated polymer prepared by the polymerization in aqueous emulsion of monomeric material containing a single olefinic double bond and composed predominately of acrylonitrile, and then co-coagulating the mixed dispersions.

3. The method of producing a polymeric material vulcanizable to a tensile strength above 1,000 lbs./sq. in. without being compounded with carbon black which comprises admixing an aqueous dispersion comprising particles of less than .4 micron in diameter of a rubbery copolymer prepared by the polymerization in aqueous emulsion of a mixture of butadiene-1,3 and styrene containing from 50 to 90% by weight of butadiene-1,3, with an aqueous dispersion comprising particles of less than .4 micron in diameter of polyacrylonitrile, in such proportion that 15 to 60 parts of polyacrylonitrile are present for each 100 parts of rubbery copolymer, and co-coagulating the mixed dispersions.

4. A rubbery vulcanizable polymeric material prepared by the method of claim 1.

5. A rubbery polymeric material vulcanizable to a tensile strength above 1,000 lbs./sq. in. without being compounded with carbon black, said polymeric material being prepared by the method of claim 3.

6. An aqueous dispersion comprising dispersed polymeric material in the form of particles less than 0.4 micron in diameter and in which the polymeric material consists of a major proportion of a rubbery copolymer of 50 to 90% by weight of butadiene-1,3 and the remainder of copolymerizable monomeric material containing a single olefinic double bond selected from the class consisting of styrene and acrylonitrile, and a minor proportion of a hard resinous saturated polymer of a monomeric material composed predominantly of a nitrile of an alpha-methylene aliphatic monocarboxylic acid.

STUART A. HARRISON.
WALTER E. BROWN.

REFERENCES CITED

The following references are of record in the file of this patent:

UNITED STATES PATENTS

| Number | Name | Date |
|---|---|---|
| 2,078,881 | Munzinger | Apr. 27, 1937 |
| 2,211,429 | Mueller-Cunradi | Aug. 13, 1940 |

FOREIGN PATENTS

| Number | Country | Date |
|---|---|---|
| 412,301 | Great Britain | June 28, 1934 |

OTHER REFERENCES

Bacon et al., Proceedings of Rubber Tech. Conference of London, 1938.